US012631248B2

(12) United States Patent (10) Patent No.: US 12,631,248 B2
Allnoch et al. (45) Date of Patent: May 19, 2026

(54) LUBRICANT DRIP PAN FOR A TRANSMISSION HOUSING OF A VEHICLE TRANSMISSION

(71) Applicant: ZF Friedrichshafen AG, Friedrichshafen (DE)

(72) Inventors: Christopher Allnoch, Kressbronn (DE); Gabriele Glade, Friedrichshafen (DE); Stephan Brussa, Langenargen (DE); Andreas Geiger, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/933,730

(22) Filed: Oct. 31, 2024

(65) Prior Publication Data

US 2025/0137523 A1 May 1, 2025

(30) Foreign Application Priority Data

Oct. 31, 2023 (DE) ..................... 10 2023 210 773.2

(51) Int. Cl.
*F16H 57/04* (2010.01)
(52) U.S. Cl.
CPC ..... *F16H 57/0423* (2013.01); *F16H 57/0402* (2013.01); *F16H 57/0483* (2013.01)
(58) Field of Classification Search
CPC ................................................ F16H 57/0423
See application file for complete search history.

(56) References Cited

U.S. PATENT DOCUMENTS 6,189,412 B1 * 2/2001 Tsubata ............... F16H 61/0009
74/606 R
11,994,205 B1 5/2024 Powell et al.

2006/0048600 A1 3/2006 Taguchi et al.
2022/0389995 A1 * 12/2022 Glade ..................... F16H 41/30
2025/0137524 A1 * 5/2025 Flogaus .............. F16H 57/0483

FOREIGN PATENT DOCUMENTS

DE 10 2020 128 934 B3 11/2021
DE 10 2021 121 421 A1 2/2023
DE 102021121421 * 2/2023
JP 2016-061333 A 4/2016

OTHER PUBLICATIONS

Office Action dated July 3, 2024, for German Patent Application No. 10 2023 210 773.2 (14 pp.), note: pp. 1 and 2 are English language Explanations to Section C. Result of Determination Document.

* cited by examiner

*Primary Examiner* — Anna M Momper
*Assistant Examiner* — Mark K Buse
(74) *Attorney, Agent, or Firm* — Crowell & Moring LLP

(57) ABSTRACT

A lubricant drip pan for a vehicle transmission housing includes a cup-shaped separating section, which at least partially encloses a receiving area in which a receiving chamber for a rotating gear element in the vehicle transmission is defined when the drip pan is installed in the housing, and separates it from a lubrication collecting area at the bottom of the drip pan, and in which a lubricant reservoir for the vehicle transmission is formed when the drip pan is installed in the housing. There is also a suction section radially outside the separating section, partially lying in the lubricant collecting area. The suction section has a suction port and at least partially delimits a suction chamber, which supplies lubricant from the reservoir when the drip pan is installed, into which the suction port opens.

18 Claims, 9 Drawing Sheets

LUBRICANT DRIP PAN FOR A TRANSMISSION HOUSING OF A VEHICLE TRANSMISSION

CROSS-REFERENCE TO RELATED APPLICATION

This application claims priority to German Patent Application No. 10 2023 210 773.2, filed on Oct. 31, 2023, the entirety of which is hereby fully incorporated by reference herein.

TECHNICAL FIELD

The present disclosure relates to a lubricant drip pan for a vehicle transmission housing that contains a cup-shaped section, part of which encloses a receiving chamber for a rotating gear element in the transmission housing, which is separated from a lubricant collecting area at the bottom of the lubricant drip pan forming a lubricant reservoir for the vehicle transmission. The present disclosure also relates to a vehicle transmission, the housing of which contains the lubricant drip pan.

BACKGROUND

Lubricant is normally circulated through areas and components the require lubrication and/or cooling, such as where gears mesh, and bearings in vehicle transmissions. These areas and components are integrated for the most part in a lubrication system that conducts lubricant in a targeted manner into these areas and components. The lubricant in the system is normally conveyed from a reservoir to these areas and components by a pump. This reservoir is usually an area in the transmission housing where the lubricant collects after it has circulated through these areas and components.

Some transmission housings also contain lubricant drip pans that can affect the lubricant collection through targeted separation of areas.

US Pat. Pub. No. 2006/0048600 A1 discloses an automatic vehicle transmission in which a differential gear set is contained in a transmission housing. This gear set has a differential cage connected to a drive gearwheel for conjoint rotation in a receiving chamber in the housing. The transmission housing also contains a lubricant drip pan that partially encloses the drive gearwheel and the differential cage that interact with another housing element, thereby also separating this receiving chamber from a lubricant reservoir below it. This separation defines the filling level for the lubricant in the receiving chamber containing the drive gearwheel and differential cage, with a gap formed between the drip pan and the other housing element, through which lubricant can flow downward into the reservoir.

SUMMARY

Based on the above prior art, an object of the present disclosure is to create a lubricant drip pan in which a receiving area is at least partially separated from a lubricant collecting area, and with which the most compact possible lubricant supply system is obtained.

This object is achieved with the subject matter of the present disclosure in conjunction with its characterizing features. The present disclosure also describes advantageous embodiments. A vehicle transmission with a housing in which there is a lubricant drip pan is also disclosed.

The lubricant drip pan obtained with the present disclosure has a cup-shaped section, part of which encloses a receiving chamber for a rotating gear element in the transmission housing, which is separated from a lubricant collecting area at the bottom of the lubricant drip pan forming a lubricant reservoir for the vehicle transmission.

The lubricant drip pan obtained with the present disclosure has a separating section that at least partially encloses a receiving area, thus separating it from a lubricant collecting area. This separating section is cup-shaped, such that it covers an axial side of the receiving area in the radial direction as much as possible, and at least part of the receiving area in the axial direction. In this manner, the separating section of the lubricant drip pan shields the receiving area below it, in both the radial and axial directions.

When the lubricant drip pan has been installed in a transmission housing it is adjacent to a receiving chamber in the receiving area, which contains a rotating gear element for the vehicle transmission. There is also a lubricant reservoir in the lubricant collecting area at the bottom of the drip pan for the vehicle transmission, which is placed such that the drip pan substantially shields the receiving chamber from the reservoir. Consequently, the receiving chamber can be placed next to the reservoir such it can still be filled with a fluid to a level that would otherwise result in a rotating gear element sinking too deep into the receiving chamber.

This shielding by the drip pan results in a shallow lubricant level in the receiving chamber when the lubricant reservoir is full, thus preventing a waste of lubricant due to splashing caused by the rotating gear element. The cup-shaped separating section must enclose the receiving area for this, at least where it borders on the lubricant collecting area, thus separating it therefrom.

The separating section preferably has a hole through it in the axial direction, connecting the receiving area to an area above the lubricant collecting area when the lubricant drip pan has been installed. This hole forms a connection in the vehicle transmission between the rotating element and another component of the transmission. A shaft can be inserted through this hole, which is connected to the rotating gear element for conjoint rotation.

The separating section also has at least one hole which forms an attachment point where the lubricant drip pan is attached to the transmission housing.

The term, "axial," refers to an orientation parallel to an axis that is aligned with a rotational axis of the rotating element contained in the receiving chamber. "Radial" means an orientation along the diameter, with the axis passing through the middle thereof.

The lubricant drip pan used in the present disclosure is an integral part, and may not be disassembled into separate parts according to various embodiments. This drip pan is preferably made of a plastic or metal.

The present disclosure also contains a suction section that is radially outside the separating section, and therefore at least partially in the lubricant collecting area. The suction section has a suction port and at least partially delimits a suction chamber, which supplies lubricant from the reservoir. In other words, a suction section is formed next to the separating section in the lubricant drip pan obtained with the present disclosure, which is linked radially to the separating section on the outside thereof, and is therefore at least partially inside the lubricant collecting area. The suction section has a suction port, and also defines at least part of a suction chamber that can be supplied with lubricant from the reservoir when the drip pan has been installed. The port opens into the suction chamber for this, such that lubricant therein can be removed through this port.

This design for a lubricant drip pan has the advantage that it not only shields the receiving area from at least the lubricant collecting area, but also functions as a suction line with which lubricant can be suctioned out of the reservoir. Consequently, a compact pump can be placed near the drip pan, resulting in a compact lubricant supply system for a vehicle transmission, and therefore also a more compact transmission. This further simplifies assembly, due to a lower number of components. The suction section in the lubricant drip pan can also be placed optimally for suctioning up lubricant.

The suction port in the suction section is preferably designed to be connected directly to a pump, i.e. the pump is connected to the suction side of the port directly, or with a very short line segment. A screen can also be placed in the suction section, specifically on the suction port at the suction chamber end.

That the suction section is "at least partially" delimited by the suction chamber means that the suction chamber is either defined entirely by the suction section, or that it is delimited by the suction section and at least one other component, which is not part of the lubricant drip pan.

The suction section therefore preferably partially delimits the suction chamber and has an opening surrounded by a flange on the suction section. This flange on the suction section is used to attach a cover that seals the opening, thus enclosing the suction chamber within the suction section and the cover. Consequently, most of the suction chamber is defined by the suction section in the lubricant drip pan, which can be easily produced because of the opening. Moreover, an intake through which lubricant from the reservoir can be supplied to the suction chamber can be formed on the cover or between the suction section and the cover.

A permanent magnet can also be placed in the lubricant collecting area. This can reliably attract and remove metal particles in the lubricant suctioned out of the reservoir into the suction chamber. This prevents clogging of other components in the lubricant supply system, in particular the pump.

One design of the present disclosure also contains a collecting section that at least partially defines a collecting chamber. This collecting section has at least one intake through which lubricant is supplied to the collecting chamber, and/or at least one drain through which lubricant is removed. This design has the advantage that the lubricant drip pan can also assume the function of a lubricant collector, from which lubricant can be further distributed. The collecting section preferably has both an intake and numerous drains.

The collecting section is preferably above the cup-shaped separating section when the drip pan has been installed, and borders radially on the outside of the separating section.

There is at least one hole formed in the collecting section in a further design of the aforementioned embodiment, which forms an aperture through which lubricant can be discharged from the collecting chamber. This hole thus forms a nozzle through which lubricant can be sprayed out of the collecting chamber in a targeted manner into the areas that requires lubrication. The areas where the gears in the transmission mesh can be supplied with lubricant by this means.

The collecting section can also partially define the collecting chamber in the above embodiment, and has an opening surrounded by a flange on the collecting section.

This flange is used to attach a cover with which the collecting chamber can be sealed, thus defining the collecting chamber within the collecting section and the cover. The collecting chamber can be advantageously formed in a simple manner by the collecting section and the separate cover attached thereto. The cover on the opening has at least one intake port opening into the collecting chamber. The cover preferably has exactly one intake port, which is designed in particular as a connection to a filter element.

The at least one drain in the various embodiments described above is formed by a drain connector on the collecting section. There is therefore at least one drain connector to which a line can be connected on the collecting section. The collecting section particularly preferably has two drain connectors.

In another embodiment of the present disclosure, the separating section at least partially surrounds the receiving area with a hollow section separating it from the exterior in which the lubricant collecting area is also located. This hollow section of the separating section can at least partially separate the receiving area from the exterior, and thus from the lubricant collecting area. This at least one hollow section preferably at least partially separates the receiving area from the exterior as well.

In another design of the above embodiment, the inner wall of the at least one hollow section is interrupted in at least one area, in which a drain is formed. These drains run radially outward, at a tangent to the inner wall, and transition into pockets formed by the at least one hollow section, which are also connected to the exterior by a passage. This design has the advantage that the amount of lubricant in the receiving area can be kept low when the rotating gear element in the receiving area rotates, because the lubricant moving due to the rotation of the gear element is forced into these drains, and can exit through the pockets and passages into the exterior. In this respect, a removal channel is formed by each combination of a drain, pocket and passage.

Each of the drains in the hollow sections are above the lubricant collecting area when the lubricant drip pan has been installed, at a height where lubricant can flow out of the receiving area into the exterior, but not back into the receiving area from the exterior.

There are preferably two drains on the at least one hollow section, which are substantially at the same height above the lubricant collection area, and separated from one another over the circumference. This reliably ensures that lubricant can be removed from the receiving area when the rotating elements therein rotate in opposite directions. This allows the lubricant to be removed through a drain when rotating in either direction.

The at least one hollow section has at least one penetration in an upper area, connecting the receiving area to the exterior. Lubricant can be conducted in a targeted manner from the exterior into the receiving area, lubricating the rotating elements therein. The at least one penetration is a radial hole forming an aperture for the lubricant. A recess is formed on the hollow section where the penetration opens toward the exterior. This facilitates the accumulation of lubricant near the opening.

The above variations of the above embodiment can be combined, in which the separating section has a first hollow section connected to a second hollow section by a radial intermediate section, with a drain in the first hollow section and the at least one penetration in the second hollow section. This results in a separating section in which the receiving area is reliably separated radially and axially from at least the lubricant collecting area. The first hollow section preferably extends substantially in the axial direction, forming a cylinder, while the second hollow section extends substantially in the axial direction in a first, cylindrical part, and in both the axial and radial direction in a second part. The second part of the second hollow section is therefore conical.

In another design of the present disclosure there is at least one line segment with two connectors. The lubricant drip pan obtained with the present disclosure can thus advantageously form part of a line for a lubricant supply system in the vehicle transmission, resulting in a compact assembly without the need for separate channels and/or tubes.

The lubricant drip pan described above is part of a housing for a vehicle transmission in particular. This drip pan delimits a receiving chamber separated from a lubricant reservoir by the drip pan. A pump is also connected at the suction port to the suction section of the lubricant drip pan. This results in a compact vehicle transmission that can be easily installed.

The other end of the pump is connected by a line segment on the drip pan to a cooler and/or a filter element, which then connects to a collecting section of the drip pan, from which the lubricant can be further distributed to various areas. In particular, an electric machine is also integrated in the vehicle transmission housing, with which lubricant can be supplied from the collecting section to cool a rotor and/or stator in the electric machine. Moreover, lubricant is sprayed in a targeted manner into areas where it is required through holes in the collecting section. The lubricant drained off after cooling the rotor and/or stator is then conducted through the at least one penetration in the separating section into the receiving area, where it is conducted to the rotating gear element therein.

In particular, a differential gear set for the vehicle transmission is contained in the receiving chamber delimited by the lubricant drip pan.

An advantageous embodiment of the present disclosure, which shall be explained below, is shown in the drawings.

DETAILED DESCRIPTION

Figure 1:
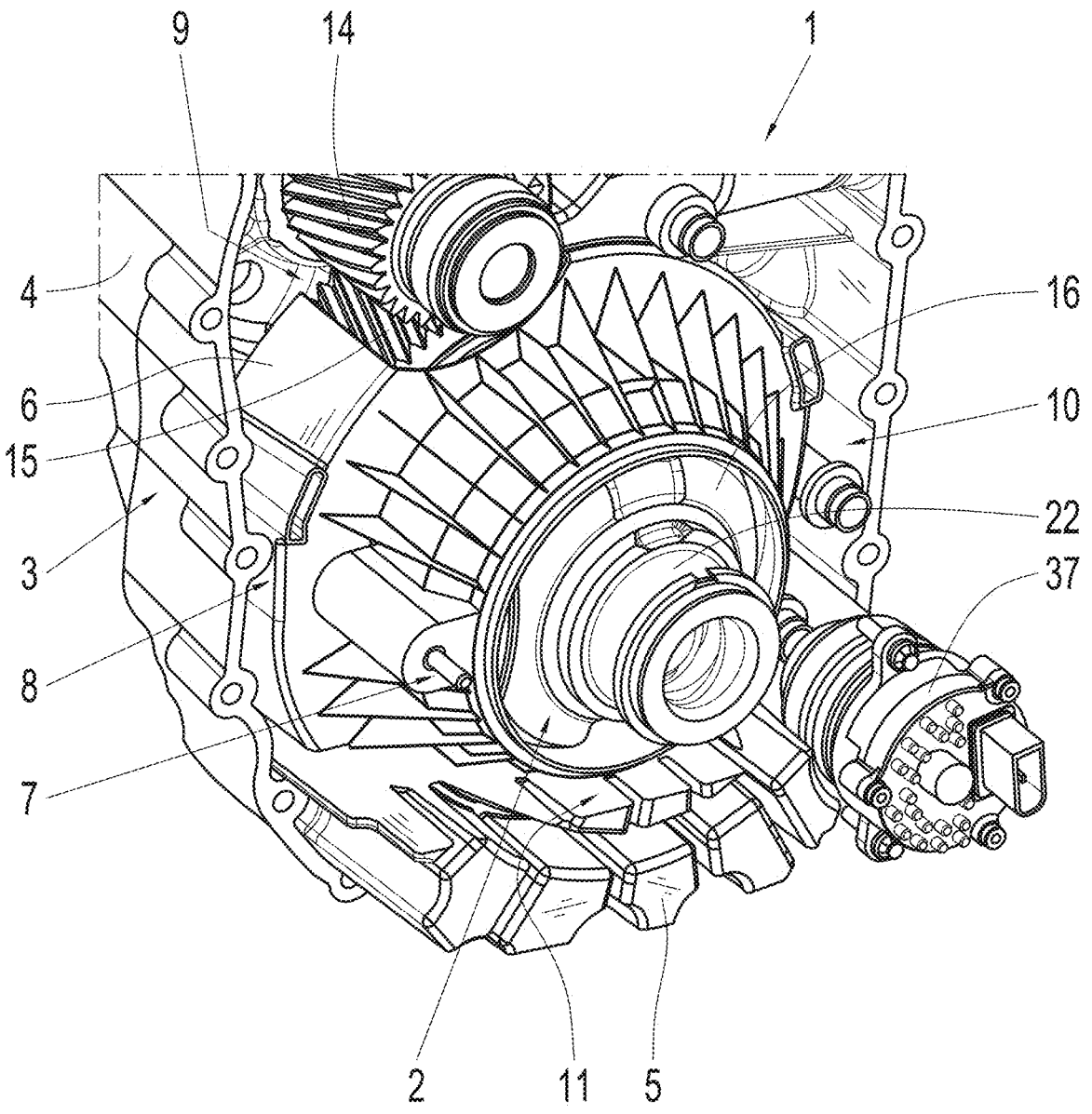
FIG. 1 shows a perspective view one embodiment of part of a vehicle transmission with a lubricant drip pan.

FIG. 1 shows a perspective view of the part of a vehicle transmission 1 containing a differential gear set 2, in which only part of the housing 3 is shown. In addition to an outer housing part 4 and a housing part 5 contained therein, the transmission housing 3 has a lubricant drip pan 6 obtained in a preferred embodiment of the present disclosure.

The lubricant drip pan 6 is attached to the transmission housing 3 with a threaded fastener 7 and has a cup-shaped separating section 8 that separates a receiving chamber 9 from the rest of the interior 10 and a lubricant reservoir 11 therein. Separating the receiving chamber 9 from the reservoir 11 prevents the lubricant from reaching a level in the receiving chamber that would otherwise lead to increased splash losses caused by the differential gear set 2.

Figure 2:
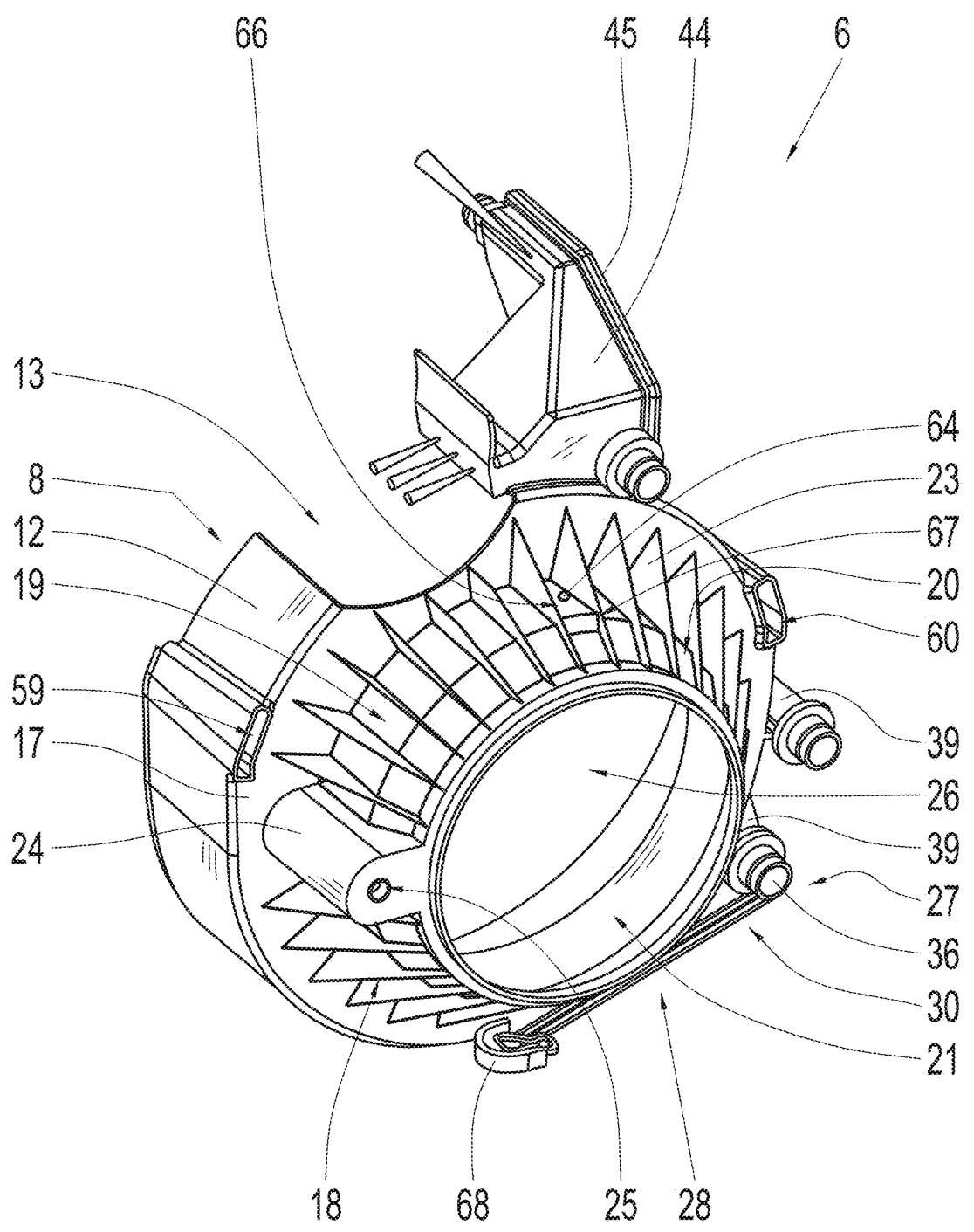
FIG. 2 shows a perspective illustration lubricant drip pan in FIG. 1.

FIG. 2 shows a perspective view of just the lubricant drip pan 6. The separating section 8 has a cylindrical first hollow section 12 with a cutout 13 near the top when the drip pan 6 is in the installed position. As can be seen when combined with the perspective view shown in FIG. 1, the teeth of a pinion 14 mesh with those of a drive gearwheel 15 that is connected to a differential cage 16 for conjoint rotation and contained, along with the rest of the differential gear set 2, in the receiving chamber 9 above this cutout 13.

Because of its cylindrical design, the first hollow section 12 of the separating section 8 extends substantially in only the axial direction, wherein an intermediate section 17 of the separating section 8 adjoins the separating section 8 and extends radially inward from the first hollow section 12. The intermediate section 17 connects the first hollow section 12 to a second hollow section 18 formed by a first part 19 and second part 20. The second hollow section 18 is connected at the first part 19 to the intermediate section 17, wherein the first part extends substantially in the axial direction, and therefore basically forms a hollow cylinder. The shape of the second part 20 extends in both the axial and radial directions, and is thus conical.

A hole 21 is formed on the end of the second part 20 of the hollow section 18, through which a shaft 22 is inserted to obtain a connection through the lubricant drip pan 6 to the differential gear set 2 for conjoint rotation (see FIG. 1). The lubricant drip pan 6 is reinforced with fins 23 connecting the hollow section 18 to the intermediate section 17. There is also a molding 24 on the hollow section 18 with a hole 25 passing through it. A threaded fastener passes through this hole 25.

The basically cup-shaped design of the separating section is formed by the two hollow sections 12 and 18, and the intermediate section 17, which also separates a receiving area 26 in the lubricant drip pan 6, in which the receiving chamber 9 is defined in the installed state, from the exterior 27 and a lubricant collecting area 28 therein. The rest of the interior 10 and the lubricant reservoir 11 in the lubricant collecting area 28 are thus formed within the exterior 27 when the lubricant drip pan 6 has been installed.

Figure 3:
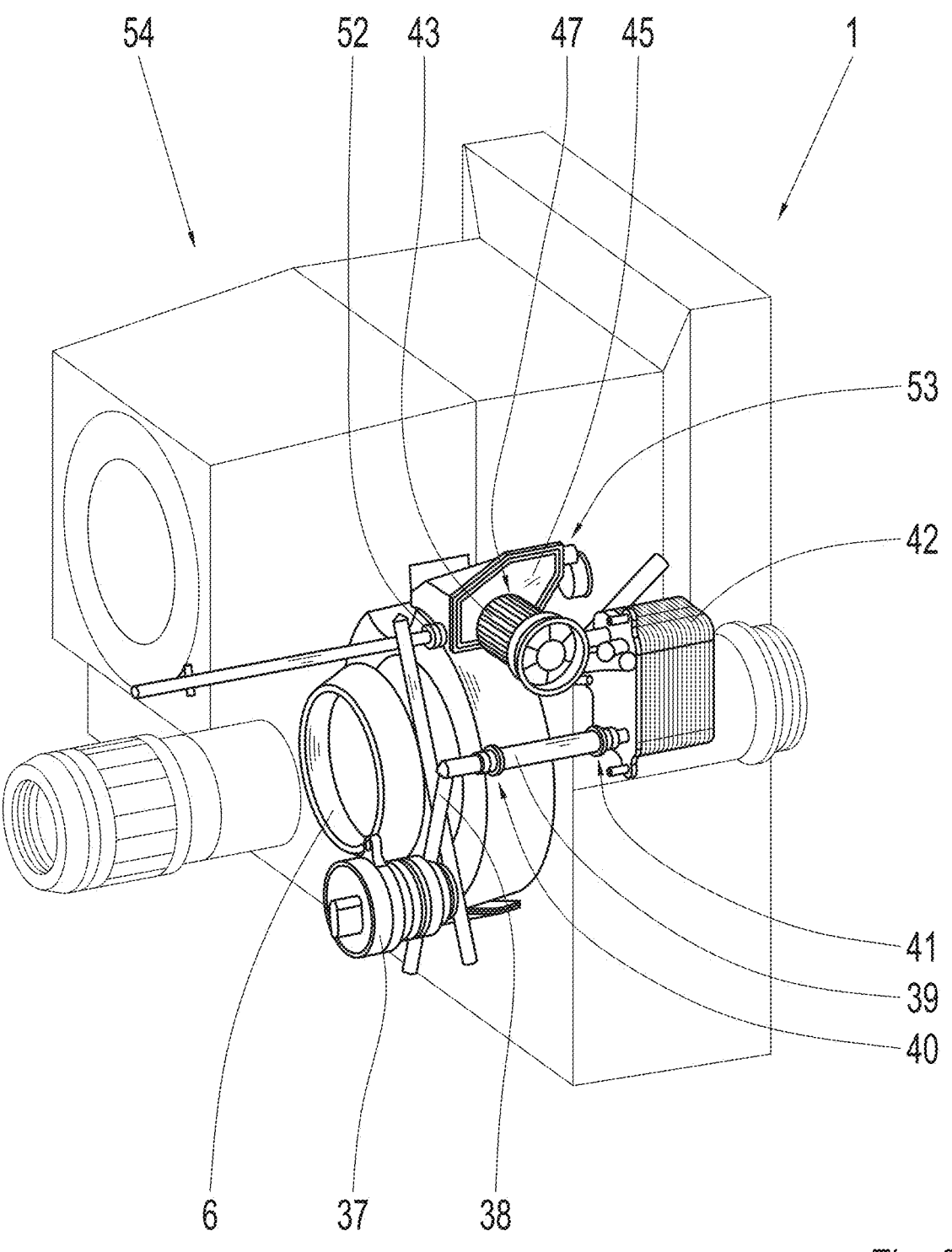
FIG. 3 shows a view of a lubricant supply system for the vehicle transmission in FIG. 1.
Figure 4:
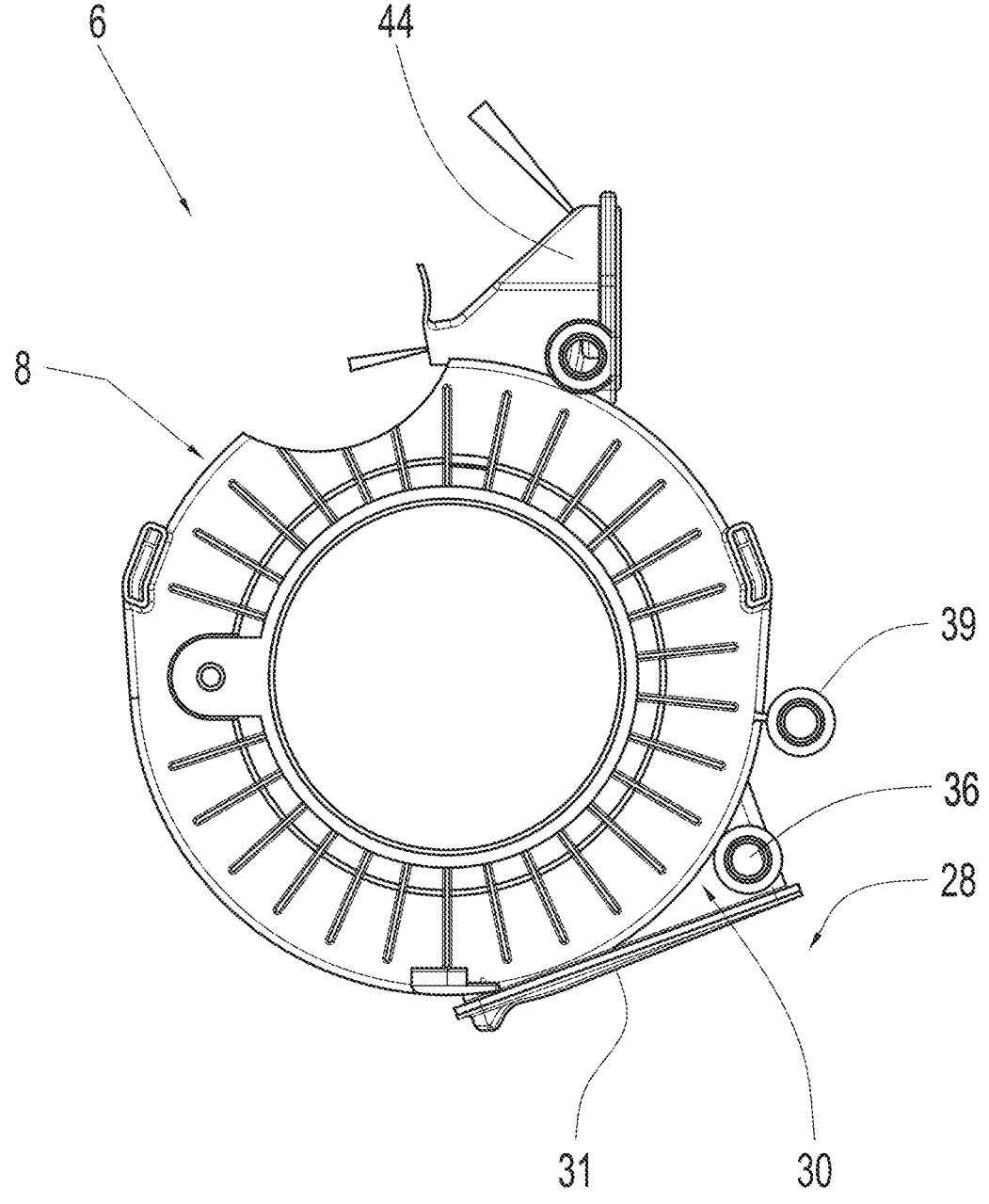
FIG. 4 shows another view of the lubricant drip pan shown in FIGS. 1 and 2.
Figure 5:
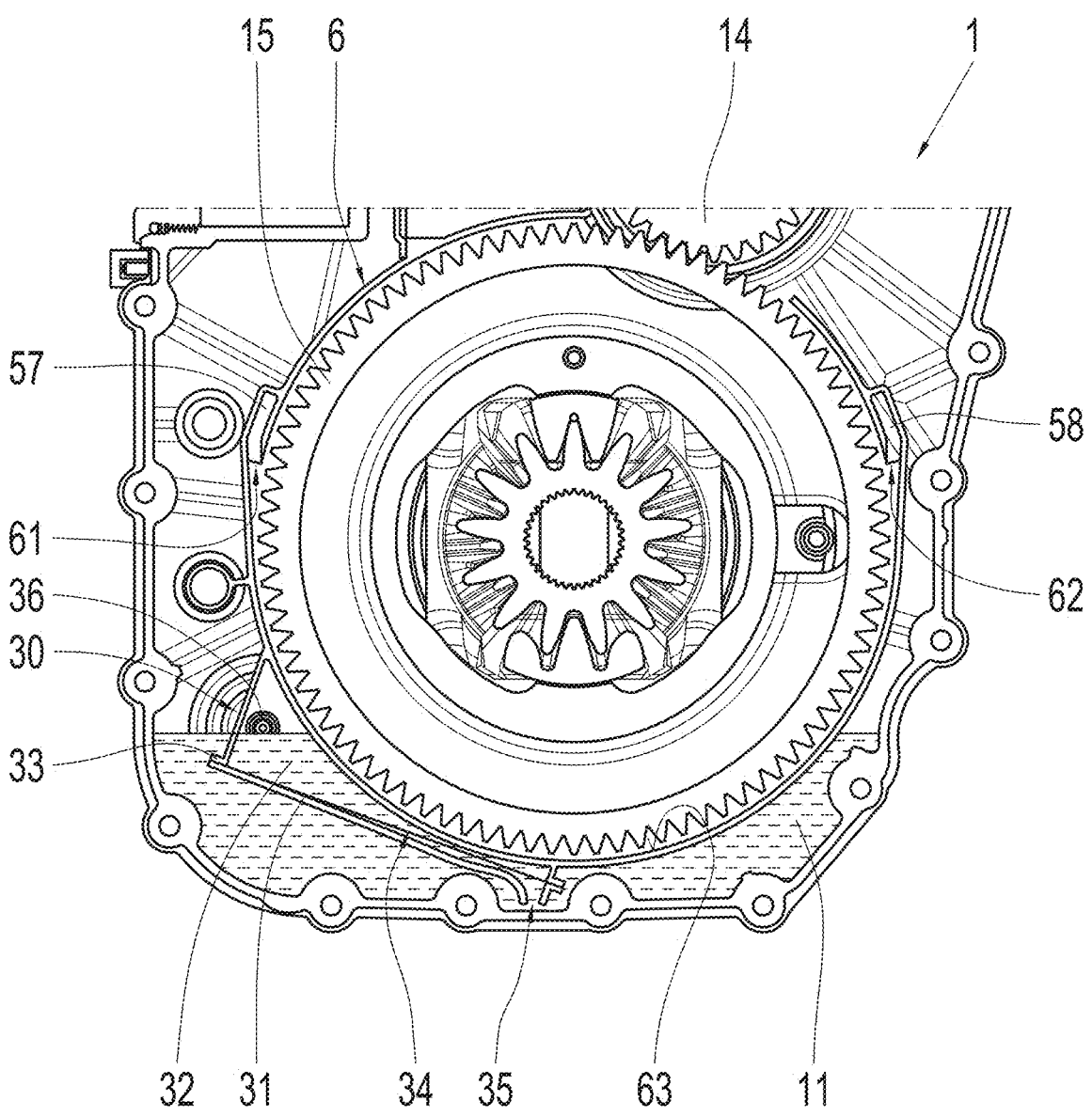
FIG. 5 shows a sectional view of the vehicle transmission in FIG. 1.

Aside from separating the receiving chamber 9 from the rest of the interior 10, and in particular the lubricant reservoir 11, the drip pan 6 is also part of a lubricant supply system 29 for the vehicle transmission 1, part of which is shown in FIG. 3. The drip pan 6 thus forms a suction point for the lubricant supply system 29 in that it also has a suction section 30 next to the separating section 8, which can be seen in the other illustration of the drip pan 6 shown in FIG. 4 and in the sectional view of the vehicle transmission 1 shown in FIG. 5. This suction section 30 is at the bottom and outside the separating section 8 when the drip pan is in the installed position, and delimits a suction chamber 32 with a cover 31 attached to the suction section 30, as can be seen in FIG. 5 in particular. At least part of this suction section 30 is in the lubricant collecting area 28, and therefore also at least partly in the lubricant reservoir 11.

The cover 31 is attached to the suction section 30 at a flange 33 and seals an opening 34 in the suction section 30, thus enclosing the suction chamber 32. A suction opening 35 is also formed on the cover 31 through which lubricant can flow from the reservoir 11 into the suction chamber 32, as shown in FIG. 5. The suction section 30 also has a suction port 36, to which the suction end of a pump 37 in the lubricant supply system 29 is connected.

FIG. 3 shows that a pressure end of the pump 37 is then connected to a line segment 39 in the lubricant supply system 29 by a connecting line 38, which is also on the outside of the separating section 8 of the drip pan 6, and has two connecting points 40 and 41. The connection to the connecting line 38 is obtained at the connecting point 40, and a cooler 42 is connected to the connecting point 41, where the lubricant conveyed by the pump 37 can exchange heat with another medium, in particular water. The cooler 42 has a filter element 43 that filters out particles in the lubricant.

After passing through the filter element 43, the lubricant is distributed to different areas by the lubricant drip pan 6. The drip pan 6 has a collecting section 44 above the separating section 8. This collecting section 44 and a cover 45 attached thereto delimit a collecting chamber 46, in which the filtered lubricant is collected and from which it is distributed to the areas where it is needed. The collecting chamber 46 can be seen in particular in the illustration of the collecting section 44 shown in FIG. 6. The cover 45 has a hole for the filter element 43 that forms an intake 47 for the collecting chamber 46. There is also a flange 48 on the side of the collecting section 44 to which the cover 45 is attached to seal the opening 49 in the collecting section 44 surrounded by the flange 48, thus defining the collecting chamber 46.

Figure 6:
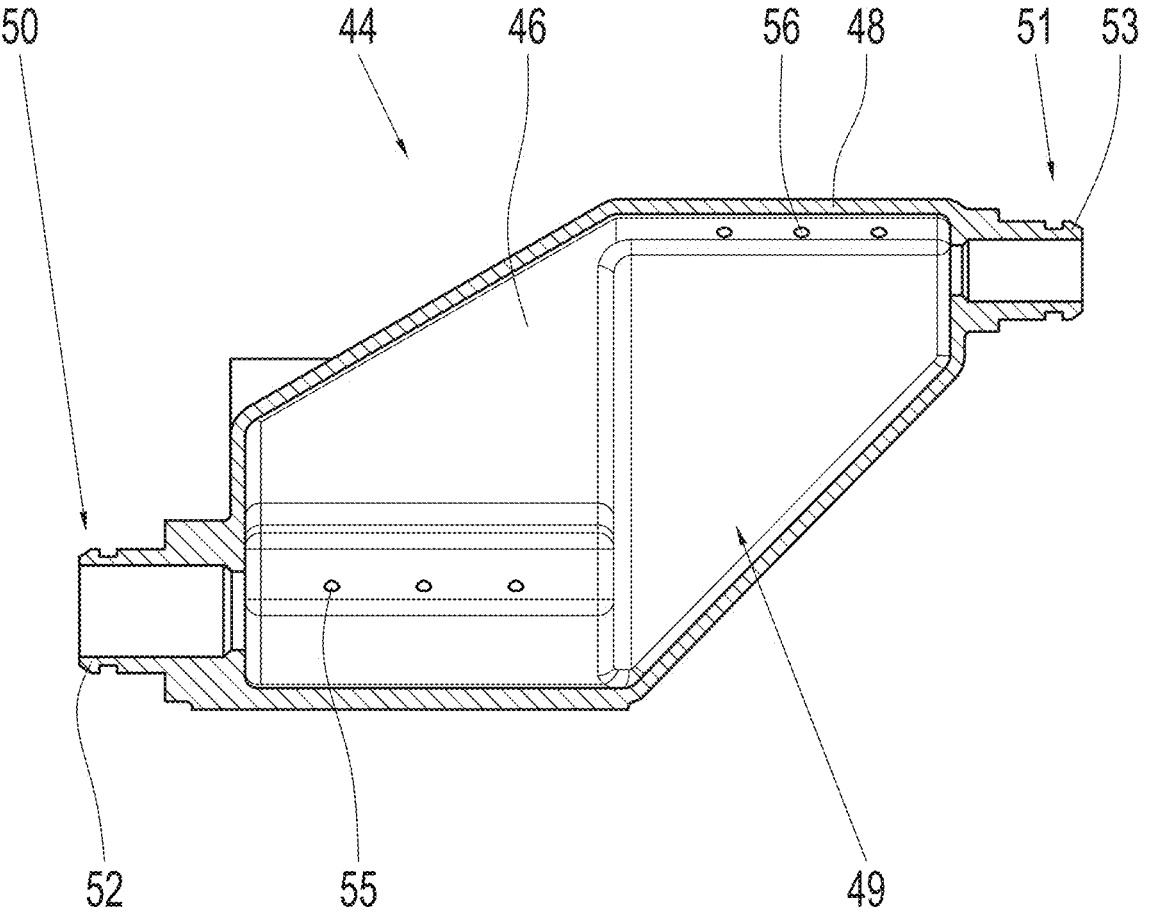
FIG. 6 shows a detail of a collecting section of the lubricant drip pan shown in FIGS. 1, 2 and 4.

As can be seen in FIGS. 2 and 6, there are two outlets 50 and 51 formed by outlet connectors 52 and 53 on the collecting section 44. The drain connector 52 is connected in the lubricant supply system 29 to a stator cooler for an electric machine 54—indicated in FIG. 3—for the vehicle transmission 1, and the drain connector 53 is connected to a rotor cooler for the electric machine 54.

Figure 7:
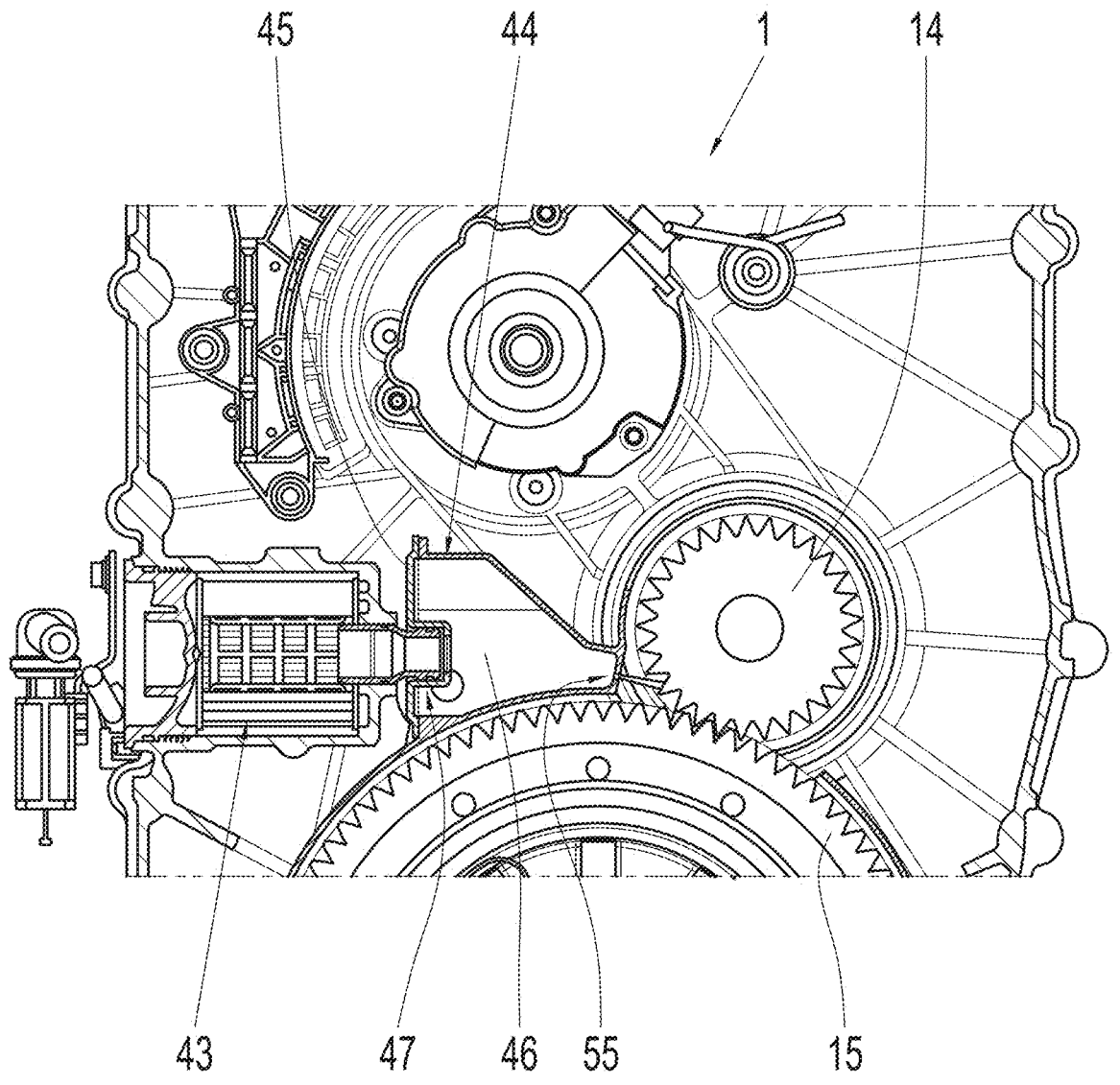
FIGS. 7, 8, and 9 show other sectional views of the vehicle transmission in FIG. 1.
Figure 8:
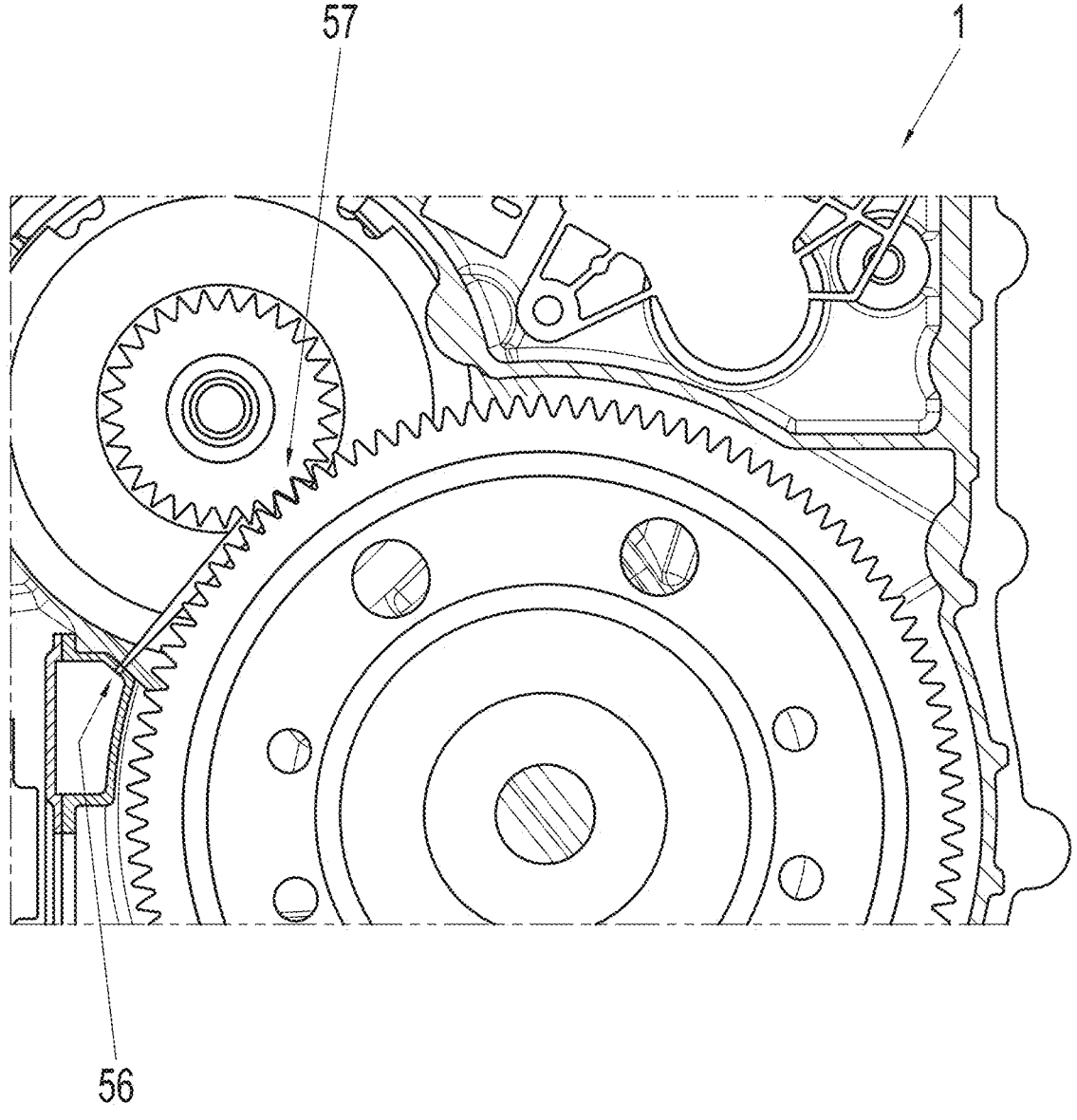

There are other holes 55 and 56 in the collecting section 44, which form apertures, as can be seen in FIG. 6. These holes 55 and 56 function as nozzles that spray out lubricant when a certain pressure is reached in the collecting chamber 46. This is indicated in FIG. 2 and in FIG. 4. Lubricant is also sprayed through the holes 55 toward where the teeth of the pinon 14 mesh with those of the drive gearwheel 15, as can be seen in the sectional view of the vehicle transmission 1 shown in FIG. 7. FIG. 8 shows that another meshing 57 in the vehicle transmission 1 is also supplied with lubricant through the holes 56.

Apart from the separating function, the hollow section 12 of the separating section 8 also has pockets 57 and 58 to prevent excessive accumulation of lubricant in the receiving section 26 and therefore in the receiving chamber 9, which are above the middle of the separating section 8 at substantially the same height, and each have a passage 59 and 60, respectively, connecting to the exterior 27 of the drip pan 6 and thus to the rest of the interior 10. This can be seen in particular in FIGS. 2 and 5. The individual pockets 57 and 58 are each connected by drains 61 and 62 to the receiving area 26, which interrupt an inner wall 63 of the hollow section 12, and transition radially outward to the respective pockets 57 and 57, which are tangential to the inner wall 63. When the drive gearwheel 15 rotates, lubricant is conveyed into one of the drains 61 or 62, and thus into its pocket 57 or 58, depending on the direction of rotation, from which the lubricant can then exit through the respective passage 59 or 60. This empties the receiving chamber 9 when the differential gear set 2 rotates, causing the drive gearwheel 15 to rotate.

Figure 9:
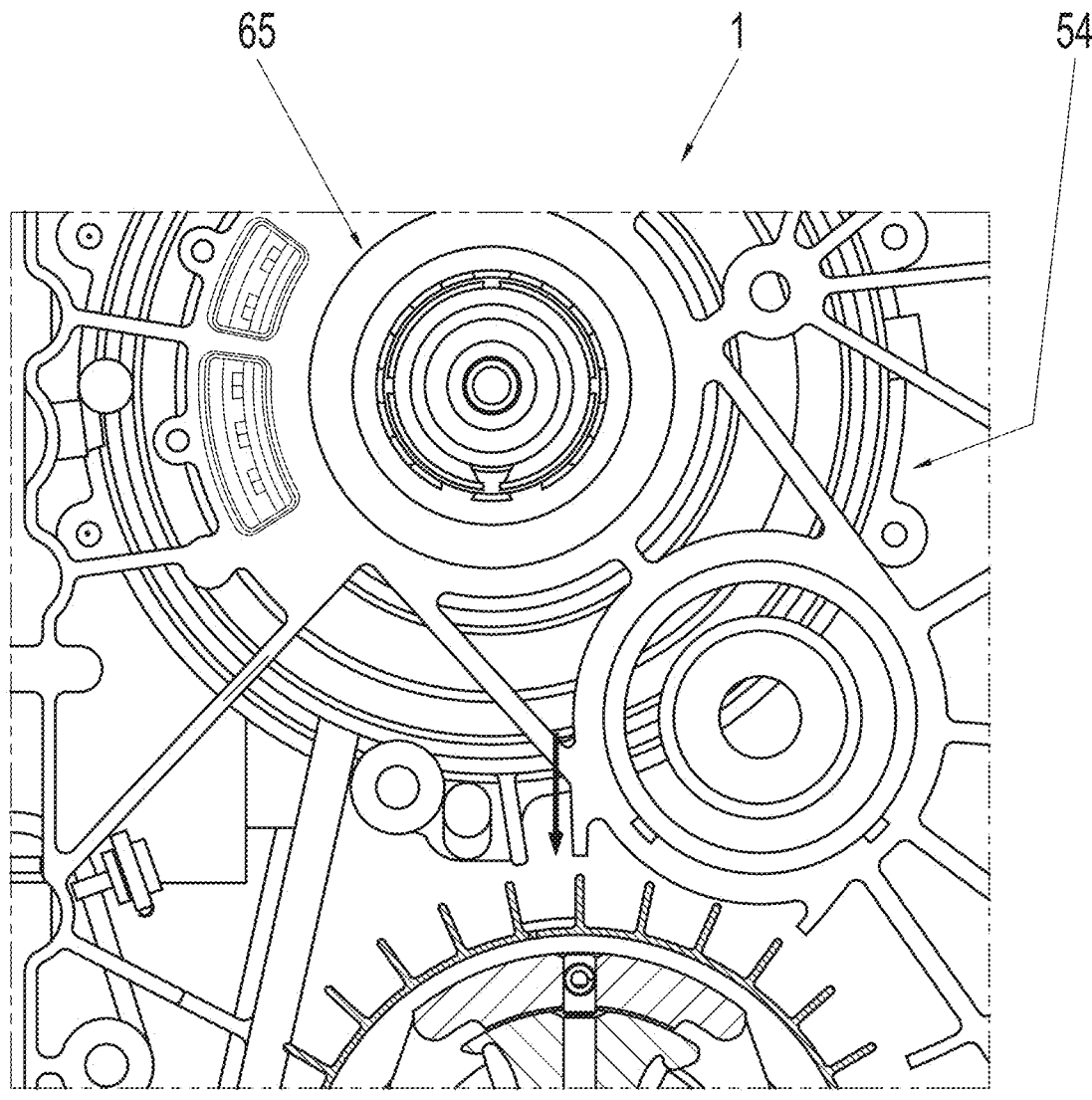

Lubricant is also supplied to the receiving chamber 9 by the lubricant drip pan 6 to ensure that the differential gear set 2 is sufficiently lubricated. A penetration 64 is formed in the upper part of the hollow section 18 for this, forming a hole therein, which can be seen in FIG. 2. Lubricant flowing downward after it has been supplied to a rotor 65 in the electric machine 54 can be conducted through this penetration 64 into the receiving chamber 9. This downward flow is indicated in another sectional view of the vehicle transmission 1 shown in FIG. 9. To ensure that lubricant accumulates near this penetration 64, a recess 66 is formed around the penetration 64, formed by the intermediate section 17 and by the reinforcing fins 23 on both sides of the penetration 64, as well as a ridge 67 formed on the outside of the hollow section 18.

A permanent magnet 68 is also placed on the lubricant drip pan 6 near the suction section 30, and thus inside the lubricant reservoir 11 when the drip pan 6 has been installed. This magnet 68 attracts metal particles and removes them from the lubricant.

In addition to separating a receiving area from a lubricant collecting area, the lubricant drip pan obtained with the present disclosure can also perform other functions in a lubricant supply system for a vehicle transmission.

REFERENCE SYMBOLS 1 vehicle transmission
2 differential gear set
3 transmission housing
4 housing part
5 housing part
6 lubricant drip pan
7 threaded fastener
8 separating section
9 receiving chamber
10 interior
11 lubricant reservoir
12 hollow section
13 cutout
14 pinion
15 drive gearwheel
16 differential cage
17 intermediate section
18 hollow section
19 part
20 part
21 hole
22 shaft
23 reinforcing fin
24 molding
25 hole
26 receiving area
27 exterior
28 lubricant collecting area
29 lubricant supply system
30 suction section
31 cover
32 suction chamber
33 flange
34 opening
35 suction opening
36 suction port
37 pump
38 connecting line
39 line segment
40 connecting point

41 connecting point
42 cooler
43 filter element
44 collecting section
45 cover
46 collecting chamber
47 intake
48 flange
49 opening
50 outlet
51 outlet
52 drain connector
53 drain connector
54 electric machine
55 hole
56 hole
57 pocket
58 pocket
59 passage
60 passage
61 drain
62 drain
63 inner wall
64 penetration
65 rotor
66 recess
67 ridge
68 permanent magnet

The invention claimed is:

1. A lubricant drip pan for a housing for a vehicle transmission, comprising:
   a cup-shaped separating section that at least partially encloses a receiving area in which a receiving chamber for a rotating gear element in the vehicle transmission is defined when the drip pan is installed in the housing, wherein the cup-shaped separating section separates the receiving area from a lubrication collection area at a bottom of the drip pan in which a lubricant reservoir for the vehicle transmission is formed when the drip pan is installed in the housing, wherein the separating section delimits the receiving area with at least one hollow section that is at least partially surrounded by an exterior that also contains the lubricant collecting area;
   a suction section radially outside the separating section and partially lying in the lubricant collecting area, wherein the suction section comprises a suction port and at least partially delimits a suction chamber, which supplies lubricant from the lubricant reservoir when the drip pan is installed, into which the suction port opens; and
   at least one penetration in a top of the at least one hollow section that connects the exterior to the receiving area.

2. The lubricant drip pan according to claim 1,
   wherein the suction section partially delimits the suction chamber and has an opening surrounded by a flange, wherein the flange on the suction section is configured to attach a cover with which the opening on the suction section is sealed, thus enclosing the suction chamber within the suction section and the cover.

3. The lubricant drip pan according to claim 1, comprising:
   a permanent magnet placed in the lubricant collecting area.

4. The lubricant drip pan according to claim 1, comprising:
   a collecting section that at least partially defines a collecting chamber, wherein there is at least one intake on the collecting section configured to allow lubricant to be supplied therethrough to the collecting chamber; and/or
   at least one outlet configured to allow the lubricant to be removed therethrough from the collecting chamber.

5. The lubricant drip pan according to claim 4, comprising:
   at least one hole in the collecting section that forms an aperture configured to allow lubricant to be discharged therethrough from the collecting chamber.

6. The lubricant drip pan according to claim 4,
   wherein the collecting section partially defines the collecting chamber and has an opening bordered by a flange on the collecting section, and
   wherein the flange on the collecting section is configured to attach a cover to seal the opening in the collecting section and thus define the collecting chamber within the collecting section and the cover.

7. The lubricant drip pan according to claim 4,
   wherein the at least one outlet forms a drain connector on the collecting section.

8. The lubricant drip pan according to claim 1,
   wherein an inner wall of the at least one hollow section is interrupted at least once, in which drains are formed, each of which is tangential to the inner wall, running radially outward and transitioning into a pocket formed on the at least one hollow section, which is connected in each case by a passage to the exterior.

9. The lubricant drip pan according to claim 1, comprising:
   a recess formed in the at least one hollow section surrounding the penetration where it opens toward the exterior.

10. The lubricant drip pan according to claim 1,
   wherein the separating section has a first hollow section that is connected by a radially inward extending intermediate section to a second hollow section, wherein the first hollow section has drains, and at least one penetration is formed in the second hollow section.

11. The lubricant drip pan according to claim 1, comprising:
   at least one line segment with two connecting points.

12. A vehicle transmission comprising:
   a housing comprising the lubricant drip pan according to claim 1,
   wherein the drip pan delimits a receiving chamber separated from a lubricant reservoir by the drip pan, and
   wherein a pump is connected at its suction end to the suction port on the suction section of the drip pan.

13. The vehicle transmission according to claim 12,
   wherein the receiving chamber contains a differential gear set.

14. A lubricant drip pan for a housing for a vehicle transmission, comprising:
   a cup-shaped separating section that at least partially encloses a receiving area in which a receiving chamber for a rotating gear element in the vehicle transmission is defined when the drip pan is installed in the housing, wherein the cup-shaped separating section separates the receiving area from a lubrication collection area at a bottom of the drip pan in which a lubricant reservoir for the vehicle transmission is formed when the drip pan is installed in the housing;
   a suction section radially outside the separating section and partially lying in the lubricant collecting area, wherein the suction section comprises a suction port and at least partially delimits a suction chamber, which supplies lubricant from the lubricant reservoir when the drip pan is installed, into which the suction port opens; and a collecting section that at least partially defines a collecting chamber, wherein there is at least one intake on the collecting section configured to allow lubricant to be supplied therethrough to the collecting chamber, and/or at least one outlet configured to allow the lubricant to be removed therethrough from the collecting chamber.

15. The lubricant drip pan according to claim 14, comprising:

at least one hole in the collecting section that forms an aperture configured to allow lubricant to be discharged therethrough from the collecting chamber.

16. The lubricant drip pan according to claim 14, wherein the collecting section partially defines the collecting chamber and has an opening bordered by a flange on the collecting section, and wherein the flange on the collecting section is configured to attach a cover to seal the opening in the collecting section and thus define the collecting chamber within the collecting section and the cover.

17. The lubricant drip pan according to claim 14, wherein the at least one outlet forms a drain connector on the collecting section.

18. A lubricant drip pan for a housing for a vehicle transmission, comprising:

a cup-shaped separating section that at least partially encloses a receiving area in which a receiving chamber for a rotating gear element in the vehicle transmission is defined when the drip pan is installed in the housing, wherein the cup-shaped separating section separates the receiving area from a lubrication collection area at a bottom of the drip pan in which a lubricant reservoir for the vehicle transmission is formed when the drip pan is installed in the housing, wherein the separating section delimits the receiving area with at least one hollow section that is at least partially surrounded by an exterior that also contains the lubricant collecting area; and a suction section radially outside the separating section and partially lying in the lubricant collecting area, wherein the suction section comprises a suction port and at least partially delimits a suction chamber, which supplies lubricant from the lubricant reservoir when the drip pan is installed, into which the suction port opens;

wherein an inner wall of the at least one hollow section is interrupted at least once, in which drains are formed, each of which is tangential to the inner wall, running radially outward and transitioning into a pocket formed on the at least one hollow section, which is connected in each case by a passage to the exterior.

\* \* \* \* \*